(12) United States Patent
Sager et al.

(10) Patent No.: US 8,820,030 B2
(45) Date of Patent: Sep. 2, 2014

(54) HOLDING AND FASTENING DEVICE

(75) Inventors: Jens Sager, Grömitz (DE); Toni Grab-Renner, Lörrach (DE); Andreas Babbe, Dahme (DE)

(73) Assignee: F&F Vermogens GBR, Holstein (DE)

( * ) Notice: Subject to any disclaimer, the term of this patent is extended or adjusted under 35 U.S.C. 154(b) by 2 days.

(21) Appl. No.: 13/320,475

(22) PCT Filed: May 14, 2010

(86) PCT No.: PCT/EP2010/002979
§ 371 (c)(1),
(2), (4) Date: Feb. 27, 2012

(87) PCT Pub. No.: WO2010/130461
PCT Pub. Date: Nov. 18, 2010

(65) Prior Publication Data
US 2012/0137602 A1    Jun. 7, 2012

(30) Foreign Application Priority Data
May 15, 2009   (DE) .......................... 10 2009 021 581

(51) Int. Cl.
E04B 1/00    (2006.01)
F24J 2/52    (2006.01)
H01L 31/042  (2014.01)
H01L 31/048  (2014.01)

(52) U.S. Cl.
CPC ............. *H01L 31/0422* (2013.01); *Y02B 10/20* (2013.01); *F24J 2/5239* (2013.01); *Y02E 10/50* (2013.01); *Y02E 10/47* (2013.01); *Y02B 10/12* (2013.01); *H01L 31/0482* (2013.01); *F24J 2/5235* (2013.01)
USPC ........ 52/746.11; 52/173.3; 248/237; 248/680

(58) Field of Classification Search
USPC ........ 52/27, 29, 173.3, 506.05, 511; 248/680, 248/237, 346.01; 126/621; 136/244
See application file for complete search history.

(56) References Cited

U.S. PATENT DOCUMENTS 2,030,417 A * 2/1936 Von Forster ...................... 14/73
2,359,845 A * 10/1944 Harshberger ................... 52/314
(Continued)

FOREIGN PATENT DOCUMENTS

DE       201 17 280 U1    2/2002
DE       101 28 237 A1    12/2002
(Continued)

OTHER PUBLICATIONS

German Search Report—Feb. 9, 2010.
(Continued)

*Primary Examiner* — Brian Glessner
*Assistant Examiner* — Joshua Ihezie
(74) *Attorney, Agent, or Firm* — Brinks Gilson & Lione

(57) ABSTRACT

A holding and fastening device (1) has means for holding at least one photovoltaic module or solar collector module in an alignment suited for the intended use. The device has fastening means for fastening to a roof surface, that allow for a simple and secure attachment of solar modules even to flat roofs while preventing damage to the roof structure and without impairing the leak tightness of the roof. The fastening means have at least one flat support section (7) with a support surface for the plane-parallel support on the roof surface. The support sections (7) may be covered with an adhesive panel, preferably a bitumen panel (18), that can be glued or welded to existing panels on the roof surface. Older roofs can be pretreated for better adhesion.

10 Claims, 6 Drawing Sheets

(56) References Cited

U.S. PATENT DOCUMENTS

| | | | | |
|---|---|---|---|---|
| 3,521,414 | A | * | 7/1970 | Malissa ............................ 52/107 |
| 3,655,517 | A | * | 4/1972 | Hensley et al. ............... 202/234 |
| 4,058,111 | A | * | 11/1977 | Wendel ......................... 126/570 |
| 4,178,909 | A | * | 12/1979 | Goolsby et al. ............... 126/660 |
| 4,315,392 | A | * | 2/1982 | Sylvest ........................... 52/309.1 |
| 4,371,139 | A | * | 2/1983 | Clark ............................. 248/237 |
| 6,046,399 | A | * | 4/2000 | Kapner ......................... 136/244 |
| 6,065,256 | A | * | 5/2000 | Joko et al. ..................... 52/173.3 |
| 6,105,316 | A | * | 8/2000 | Bottger et al. ................. 52/173.3 |
| 6,360,491 | B1 | * | 3/2002 | Ullman ........................... 52/22 |
| 6,489,552 | B2 | * | 12/2002 | Yamawaki et al. ............ 136/251 |
| 6,526,701 | B2 | * | 3/2003 | Stearns et al. .................. 52/24 |
| 6,617,507 | B2 | * | 9/2003 | Mapes et al. .................. 136/251 |
| 6,767,433 | B2 | * | 7/2004 | Foster et al. ................... 202/234 |
| 6,809,251 | B2 | * | 10/2004 | Dinwoodie ..................... 136/251 |
| 6,968,654 | B2 | * | 11/2005 | Moulder et al. ............... 52/173.3 |
| 7,435,897 | B2 | * | 10/2008 | Russell .......................... 136/244 |
| 7,574,842 | B2 | * | 8/2009 | Russell .......................... 52/768 |
| 7,814,899 | B1 | * | 10/2010 | Port ................................ 126/623 |
| 7,849,849 | B2 | * | 12/2010 | Genschorek ................... 126/704 |
| 8,061,091 | B2 | * | 11/2011 | Botkin et al. .................. 52/173.3 |
| 8,151,789 | B2 | * | 4/2012 | Klein ............................. 126/704 |
| D662,042 | S | * | 6/2012 | Yeh ................................ D13/102 |
| 8,234,824 | B2 | * | 8/2012 | Botkin et al. .................. 52/173.3 |
| 8,272,176 | B2 | * | 9/2012 | Wallgren ....................... 52/173.3 |
| 8,276,330 | B2 | * | 10/2012 | Harberts et al. ............... 52/173.3 |
| 8,281,524 | B2 | * | 10/2012 | Hund et al. .................... 52/173.3 |
| 8,316,618 | B1 | * | 11/2012 | Rodowca et al. .............. 52/747.1 |
| 8,316,619 | B1 | * | 11/2012 | Rego et al. ..................... 52/747.1 |
| 2003/0101662 | A1 | * | 6/2003 | Ullman ........................... 52/27 |
| 2004/0007260 | A1 | * | 1/2004 | Dinwoodie .................... 136/251 |
| 2005/0217716 | A1 | * | 10/2005 | Masuda et al. ................ 136/244 |
| 2006/0266352 | A1 | * | 11/2006 | Marston et al. ............... 126/621 |
| 2007/0144575 | A1 | * | 6/2007 | Mascolo et al. .............. 136/246 |
| 2009/0113822 | A1 | | 5/2009 | Patrina et al. |
| 2009/0134291 | A1 | * | 5/2009 | Meier et al. ............... 248/222.14 |
| 2010/0186320 | A1 | * | 7/2010 | Hoeft et al. ................... 52/173.3 |
| 2010/0242381 | A1 | * | 9/2010 | Jenkins ......................... 52/173.3 |
| 2010/0243023 | A1 | * | 9/2010 | Patton et al. .................. 136/244 |
| 2010/0313499 | A1 | * | 12/2010 | Gangemi ...................... 52/173.3 |
| 2011/0108083 | A1 | * | 5/2011 | Ravestein et al. ............. 136/244 |
| 2011/0154744 | A1 | * | 6/2011 | Bowen ............................ 52/27 |
| 2011/0314751 | A1 | * | 12/2011 | Jette .............................. 52/173.3 |
| 2012/0036799 | A1 | * | 2/2012 | Kneip et al. ................... 52/173.3 |
| 2012/0048351 | A1 | * | 3/2012 | Rizzo ............................. 136/251 |
| 2012/0110931 | A1 | * | 5/2012 | Eiffert et al. .................. 52/173.3 |
| 2012/0144760 | A1 | * | 6/2012 | Schaefer et al. ............... 52/58 |
| 2012/0273029 | A1 | * | 11/2012 | Bragagna et al. ............. 136/251 |

FOREIGN PATENT DOCUMENTS

| | | |
|---|---|---|
| DE | 201 17 280 U1 | 5/2004 |
| DE | 20 2006 013 662 U1 | 8/2007 |
| DE | 20 2008 000 237 U1 | 7/2008 |
| DE | 10 2007 000 697 A1 | 3/2009 |
| EP | 1 267 418 A2 | 12/2002 |
| EP | 1 376 029 A2 | 1/2004 |
| EP | 2 042 822 A2 | 4/2009 |
| WO | WO 2004/063485 A2 | 7/2004 |

OTHER PUBLICATIONS

PCT International Search Report—Aug. 17, 2010.

* cited by examiner

HOLDING AND FASTENING DEVICE

CROSS REFERENCE TO RELATED APPLICATIONS

This application claims priority to German Patent Application No. 10 2009 021 581.6, filed May 15, 2009 and PCT/EP2010/002979, filed May 14, 2010.

TECHNICAL FIELD OF THE INVENTION

The present invention relates to a holding and fastening device with means for holding at least one photovoltaic module and/or solar collector module (collectively called solar module) in an alignment suited for the intended use and with fastening means for fastening to a roof surface.

The present invention likewise relates to a method of mounting a holding and fastening device for at least one solar module in an alignment suited for the intended use on a roof surface.

BACKGROUND OF THE INVENTION

Presently, various methods and holders are known with which photovoltaic systems are installed, also in particular on flat roofs. What matters in each event is a solid, in particular windproof, holder of the photovoltaic systems of solar collectors on the roof. Accordingly, it has been proposed to anchor the holders in the roof surface via drilled holes. This, however, has the disadvantage that, at the drill holes, the drill holes destroy the existing roof sealing that is typically established by bitumen panels. As a result, leaks in the roof surface can disadvantageously be caused. This problem is particularly significant for flat roofs. Further, in order not to create leaks in the roof surface, it has been proposed to fasten the holders on the side walls of the building, for instance via T-beams. This method, however, is disadvantageously very cost intense and also affects the outside appearance of the building in a frequently undesired way.

Finally, it is known to fasten the holders on the roof surface with weights. This, however has the disadvantage that the maximum snow load that the roof can bear is reduced by the mass of the holder and of the weights used for fastening it. If the roof is not otherwise additionally reinforced, a critical snow load can consequently disadvantageously already be reached with a small amount of snow.

Due to the problems and shortcomings of the known holders and methods of mounting them, solar technology has been rarely utilized in particular on flat roofs.

SUMMARY OF THE INVENTION

It is hence an objective of the present invention to provide a holding and fastening device of the aforementioned kind that, while avoiding the disadvantages of the prior art, allows for a simple and secure attachment of solar modules and/or solar collectors even to flat roofs while preventing damage to the roof structure and without impairing the leak tightness of the roof. It is likewise an objective of the present invention to provide a method of the aforementioned kind with which the aforementioned holding and fastening devices can be fastened in a safe way without damaging the roof structure and without impairing the leak tightness of the roof even on flat roofs.

This objective is achieved according to the invention for a generic holding and fastening device by fastening means having at least one flat support section with a support surface for the plane-parallel support on the roof surface. According to the invention, the support section enables fastening the holding and fastening device by way of gluing, welding, or even through magnetism or the like. In all of these cases, the support surface allows an attachment to the roof surface without any impairment of its leak tightness. Additionally a great weight of the holding and fastening element does not matter for the fastening manners according to the invention so that even a lightweight construction can be chosen to reduce the roof load to a minimum. The support sections can have the shape of tongues that extend at a right angle beyond the holder of the fastening device at the underside of the latter.

In an advantageous embodiment of the invention, the support surfaces are configured for establishing an adhesive connection with the roof surface. For example, the support surface can have a surface texture that enables the establishment of a gluing connection between the support surface and the roof surface. Fastening of the holding and fastening device occurs according to this embodiment of the invention via the adhesive connection between the support surface and the roof surface with a suitable selection of an adhesive.

In another advantageous embodiment of the invention, a fastening layer extending beyond the area of the support section is provided for creating an adhesive connection with the roof surface that substantially covers the support section. Thus, according to this embodiment of the invention a for instance bottle-like shaped support section is not directly glued onto the roof surface. Instead, the support section is covered with an in particular flexible layer panel, and an adhesive connection is only established between the fastening layer and the roof surface. According to the invention, the support section and thus the holding and fastening device is clamped under the fastening layer and fastened in this manner. An adhesive connection within the scope of the invention is also understood to be any kind of gluing connection or even a welding connection.

In an especially favorable embodiment of the invention, the fastening layer is formed from roofing felt, especially bitumen roofing panels. Roofing felt is frequently found on flat roofs and other roofs so that a connection is possible without problem by welding of an additional roofing felt of the inventive holding and fastening device with the existing roofing felt on the roof surface. The connection is optimally suited for the weather conditions of the roof. Advantageously, a very long service life can be achieved.

A special configuration of the invention provides that means for holding comprise two carrier elements that are arranged parallel at a distance from each other and that are in particular elongated and/or plate-shaped, each with a receiving surface for receiving the solar module at a distance above the roof surface, where the receiving surface of one carrier element is preferably arrangeable in a different section than the receiving surface of the other carrier element. By the construction of the holders with two separate holders, the photovoltaic module or the solar collector can, for example, be placed on the upper and lower edge. The distance between the two holders enables, for example, the attachment of fastening tongues as fastening means on each of the two individual holders in order to ensure the connection with the roof surface in the manner according to the invention. For example, bitumen panels can thus also be brought between the two individual holders in order to fix the support sections to the roof surface. The configuration of the individual holders with receiving surfaces of different heights results in a holder of the solar module as it is frequently desired for optimizing the efficiency according to the position of the sun.

In another exemplary embodiment of the invention, the receiving surfaces can be provided with a lining of vibration-damping material. In particular, an elastomeric strip of or so-called sponge rubber can be glued on in order to prevent noise, such as rattling. Further, by this measure, possible different expansions during a change in temperature can be compensated.

The stability is further improved when in an advantageous embodiment of the invention the carrier elements are connected with each other by at least one stabilizing element that is arranged substantially transverse to the carrier elements and preferably plate-like. By using carrier elements of different heights for the angled holding of the solar module, the stabilizing element may have the shape of a triangular plate. With simultaneous use of vertical profile plates as carrier elements, a closed structure can be achieved that is substantially windproof on all sides. This reduces the attack possibilities of the wind and additionally advantageously increases the stability.

If at least one carrier element or at least one stabilizing element is provided with a vent opening, a cooling of the space underneath the solar module can be ensured.

A particularly storm-proof variation of the invention is obtained if at least one carrier element is provided with connector means for fastening to at least one carrier element of a further holding and fastening device. In this manner, the holding and fastening device can advantageously be constructed from individual modules that are firmly connected among each other. According, a single continuous structure is obtained from several, rigidly connected individual modules. The storm safety improves significantly by this measure. Additionally, mounting is advantageously especially convenient and can be managed with little manpower and without an extensive crane or lifting device, for the individual modules can be small and lightweight, and the overall structure is only created during mounting on the roof. The manufacture becomes especially reasonable in cost if the holding and fastening is assembled substantially of punched parts, especially of a lightweight metal, preferably aluminum. In particular, aluminum plates with a thickness of merely 1.5 mm can be used. The holders and stabilizing elements can, according to this embodiment, be punched parts that are subsequently stamped with an angular profile. For example, the support section with support surface according to the invention can be configured as a part of the receiving holder for the solar module and be angled at 90 degrees.

The objective on which the invention is based is also achieved by an arrangement of a number of holding and fastening devices, in which several, in particular all, holding and fastening devices are fastened among each other by connecting means to an adjacent carrier element of a further holding and fastening device.

The method objective on which the invention is based is achieved by the aforementioned method in which the holding and fastening device is supported in a plane-parallel way with the planar support section on the roof surface, in which subsequently a fastening layer extending beyond the area of the support section is laid over the support section, and in which finally an adhesive connection is created between the fastening layer and the roof surface is such a manner that the support section is pressed against the roof surface by the fastening layer. In particular, according to the invention, the support section is configured as a bitumen panel that is welded onto the bitumen panels of the flat roof and/or glued onto them. Here, the support sections, that may be configured tongue-like, are firmly connected to the roof.

In particular, in an embodiment of the invention, the fastening layer can be welded or glued onto the roof surface. For improving the adhesive connection or welding connection, respectively, an exemplary embodiment of the method according to the invention provides that the roof surface is pretreated before creating the adhesive connection, in particular by applying a coating, preferably a bitumen coating.

An improvement of work safety of assembly workers during mounting results, according to another preferable embodiment of the method according to the present invention, in which, after placing the holding and fastening device on the roof surface, at least one further holding and fastening device is place on the roof surface and fastened to an adjacent holding and fastening device, and subsequently the support section of the further holding and fastening devices are pressed in a corresponding manner with a fastening layer to the roof surface. It is also proposed to assemble a solar system in a modular manner, for instance on a flat roof. Advantageously, Advantageously, the individual modules can be small and lightweight, which allows for an assembly with only a few assembly workers, for instance two. The connection of the individual modules among each other increases the stability of the overall structure and at the same time reduces its storm sensitivity.

In particular, according to another embodiment of the invention, a continuous fastening layer can be utilized for fastening several support sections. Expediently, for example, a bitumen panel can be rolled out in one piece to cover several support sections. The bitumen panel is then welded to the flat roof in one working step so that support sections configured as tongues are firmly connected to the roof. The adhesive or welding surface, respectively, between the fastening layer and the roof surface is even increased, which increases the robustness of the connection.

The connection is described in an exemplary way in the following for an exemplary embodiment with reference being made to a drawing, and additional advantageous details can be gathered from the Figures of the drawing. Functionally equivalent parts are provided with the same reference numbers.

DETAILED DESCRIPTION OF THE DRAWINGS

Figure 1:
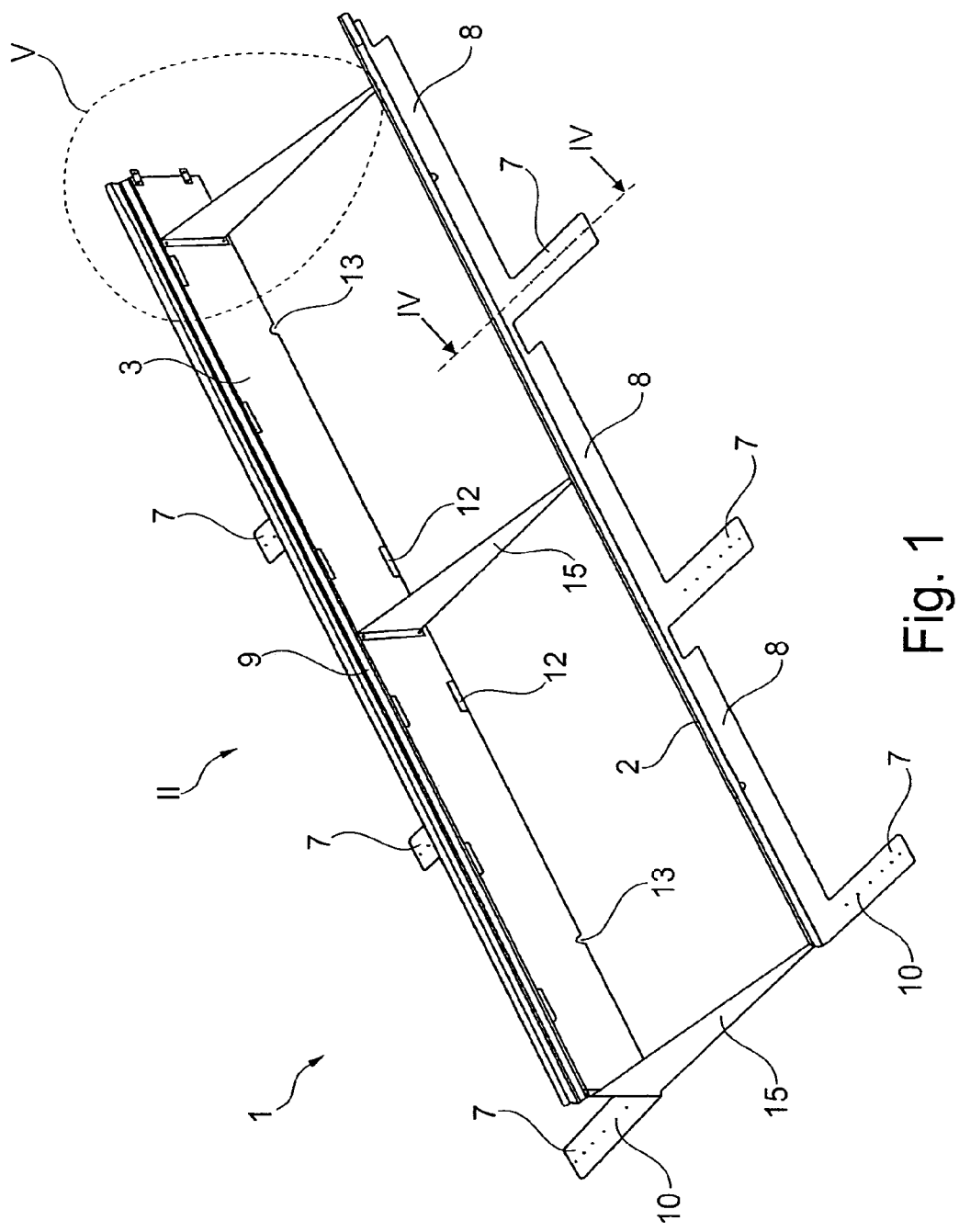
FIG. 1: a perspective view of an embodiment of a holding and fastening device according to the invention.
Figure 2:
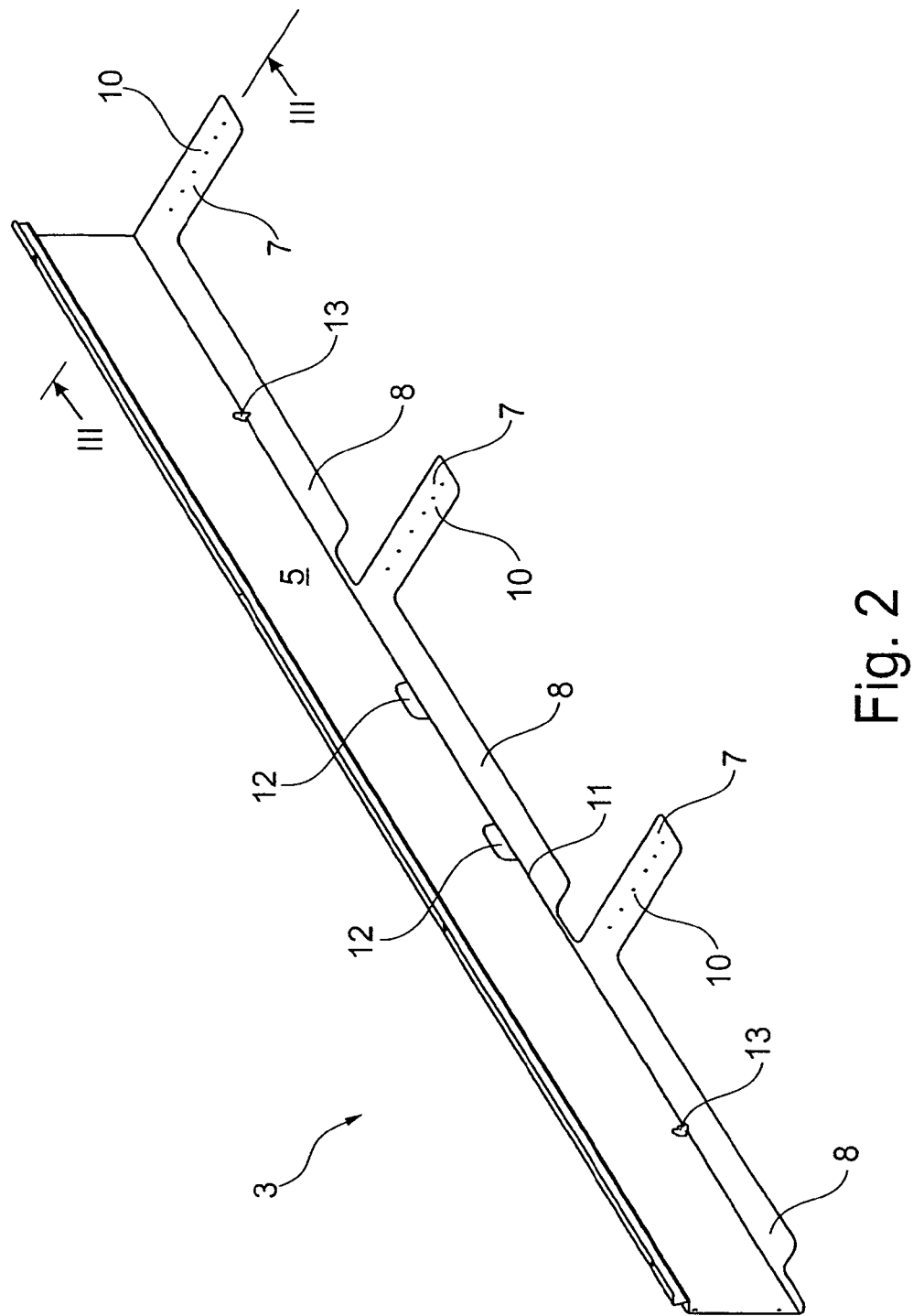
FIG. 2: a detailed depiction of the northern holder of the holding and fastening device according to FIG. 1 in a view direction of the arrow II in FIG. 1.
Figure 3:
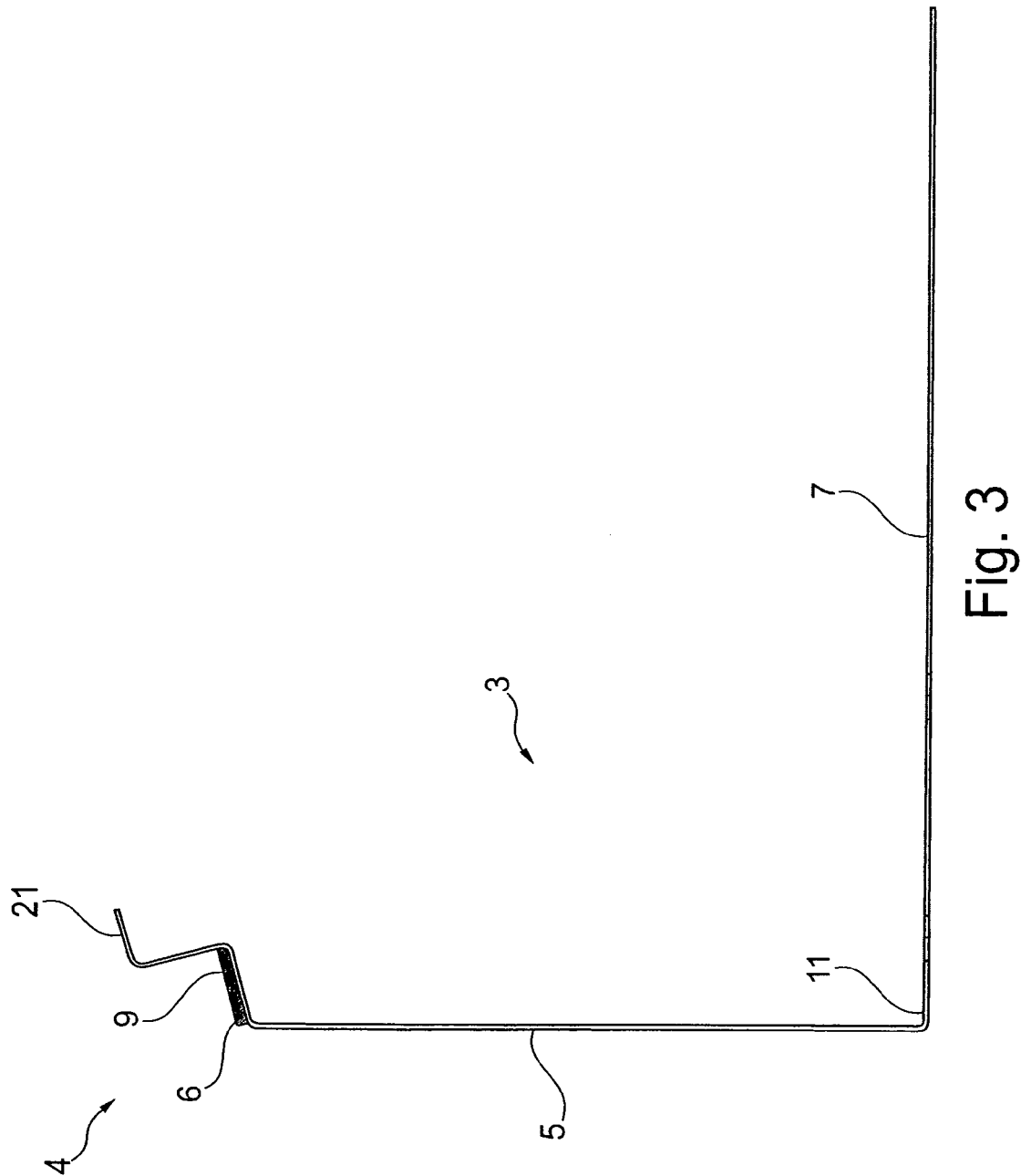
FIG. 3: a vertical cross-section through the northern holder according to FIG. 2 along the cutting line III-III in FIG. 2.
Figure 4:
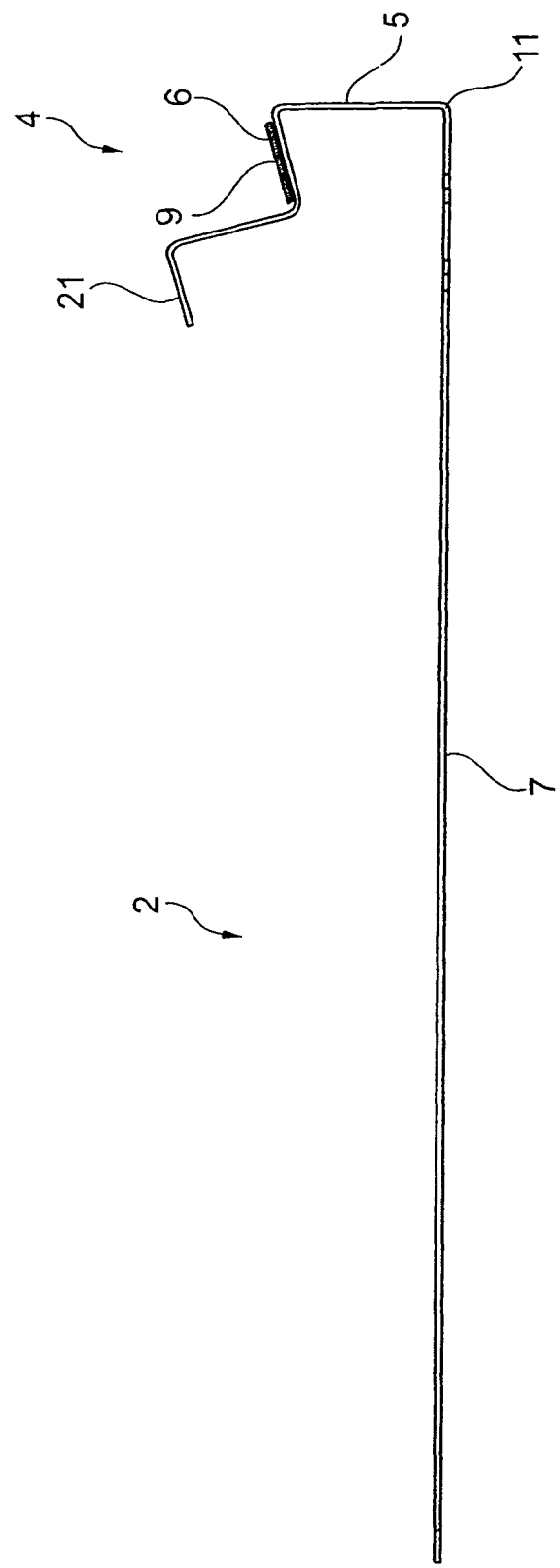
FIG. 4: a vertical cross-section through the southern holder of the solar module holder according to FIG. 1 along the cutting line IV-IV in FIG. 1.
Figure 5:
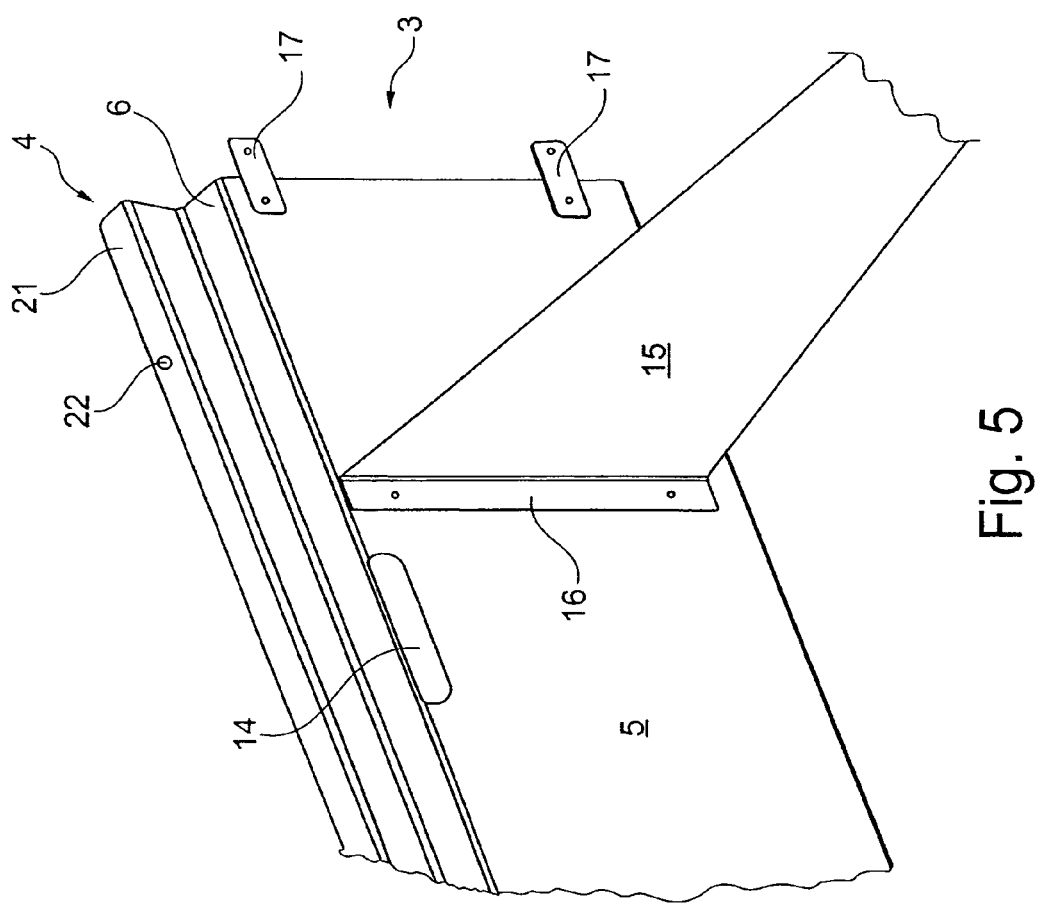
FIG. 5: a detailed depiction of the area V in FIG. 1.

FIG. 1 shows, in a perspective view from a tilted angle above, a solar module holder 1 as an exemplary embodiment of a holding and fastening device according to the invention. Its solar module holder 1 consists of a southern holder 2 and a northern holder 3. The southern holder 2 is offset by a distance in a parallel manner from the northern holder 3. The southern holder 2 as well as the northern holder 3 are constructed substantially the same. Both holders 2, 3 consist of an aluminum profile sheet with a wall thickness of 1.5 mm. The holders 2, 3 each have a receiving profile 4 at the upper end for receiving a rectangular photovoltaic module with a longitudinal edge not shown in the Figures. This is best evident in the vertical cross-sections according to FIGS. 3 and 4. The holders 2, 3 have a vertical section 5, whose length determines the height of the receiving profile 4. As is evident from the drawings, the receiving profile 4 of the northern holder 3 is arranged higher than the receiving profile 4 of the southern holder 2. Each receiving profile 4 has the shape of a double angle in the vertical cross-sectional view. The photovoltaic modules or also solar collector modules are placed on a support surface 6 of the receiving profile 4 of the holders 2, 3 of the solar module holder 1. A fastening surface 21 above the support surface of each double profile 4 is provided with drill holes 22, as evident in FIG. 5. The drill holes 22 serve for fastening the photovoltaic module or solar collector module by means of a suitably shaped clamp, which is screwed onto the bores 22.

The southern holder 2 as well as the northern holder 3 have fastening tongues 7 at their lower section opposing the receiving profile 4. The fastening tongues 7 extend at a right angle to the vertical sections 5 of the holders 2, 3. In the areas between the fastening tongues 7, outer folding slats 8 are arranged. the outer folding slats 8 have the same orientation as the fastening tongues 7. Their dimension, however, is substantially smaller than that of the fastening tongues due to punching during the manufacture.

The support surfaces 6 of the receiving profiles of the holders 2, 3 have a glued-on elastomeric strip 9 or sponge rubber, respectively, in order to prevent noise, such as rattling, and, if applicable, to compensate different material expansions during temperature changes. This is evident for the northern holder 3 particularly from FIG. 3 and for the southern holder 2 particularly from FIG. 4.

The fastening tongues 7 are provided with a number of drill holes 10 that are indicated in the drawings by a dot.

The southern holder 2 as well as the northern holder 3 are provided with several drain openings 12 at their vertical section 5 along the fold line 11. Additionally, cable feedthroughs 13 are formed respectively in the vertical section 5 along the fold line 11. In the upper area of the vertical section 5 of the holders 2, 3 air and vent openings 14 are formed in the area of the receiving profile 4. This is particularly evident from FIG. 5.

The southern holder 2 is connected to the northern holder 3 *f* via three stabilizers 15. Each stabilizer 15 consists of a stamped sheet in the shape of a rectangular triangle, where for fastening, fastening tongues 16 are located at the vertical section 5 of the southern holder 2 and the northern holder 3, respectively. The stabilizers 15 are arranged at a right angle to the southern holder 2 and the northern holder 3. The southern holder 2 as well as the northern holder 3 are provided with connectors 17 at each lateral end of the vertical section 5 for connecting with a laterally adjacent equivalently structured solar module holder.

On the southern holder 2 and the northern holder 3, respectively, the stabilizers 15 are fastened in the area of the fastening tongues 16 via blind rivets. For applying the blind rivets, suitable drill holes are provided in the respective parts to be connected. In order to enable riveting the stabilizers in various positions with the holders 2, 3, corresponding drill holes are provided in various locations of the holders 2, 3.

Figure 6:
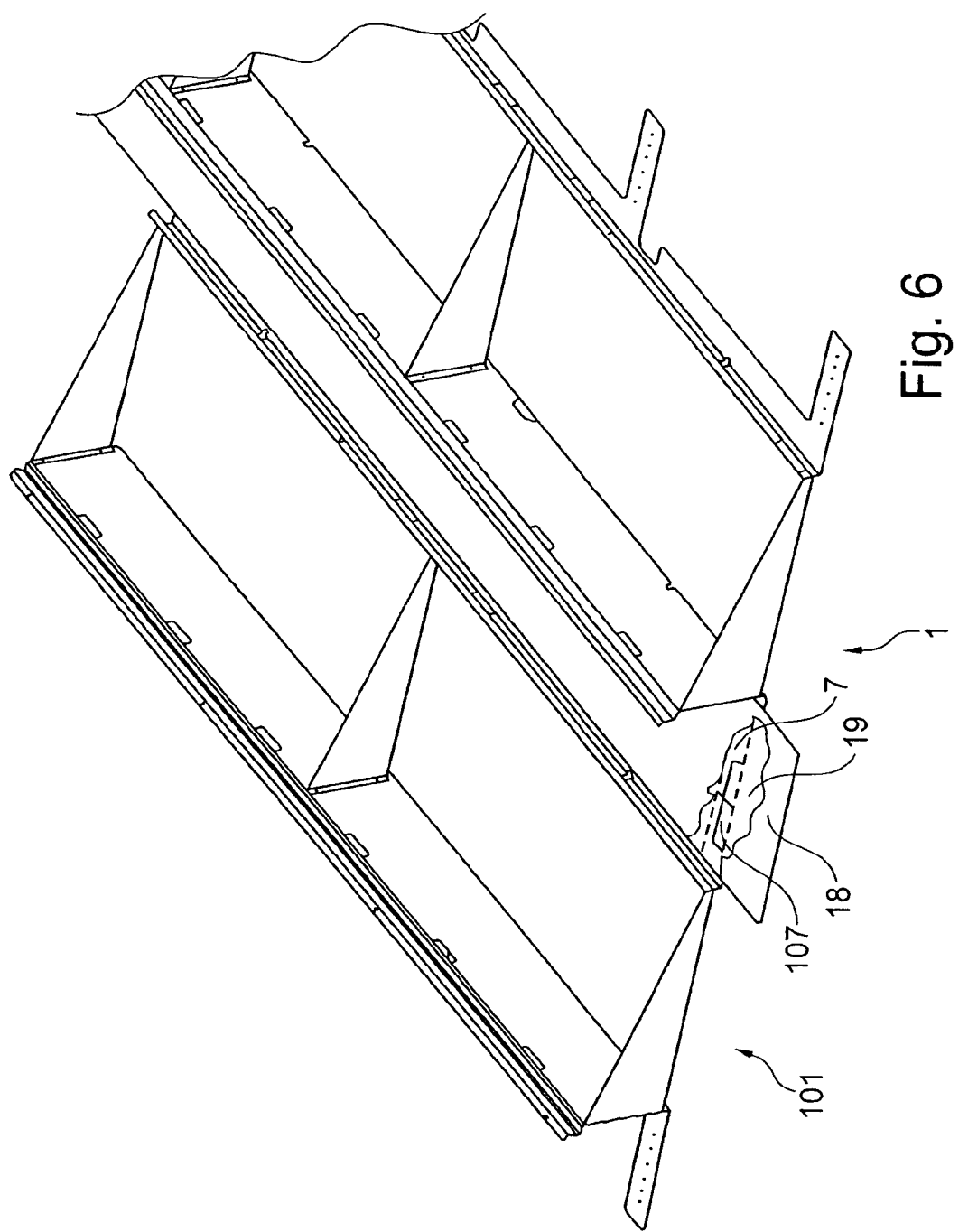
FIG. 6: a depiction of an assembly of two solar module holders according to FIG. 1 arranged behind on another.

FIG. 6 shows an arrangement consisting of the solar module holder 1 according to FIGS. 1 through 5 and a further solar module holder 101, which is arranged offset in a parallel manner behind solar module holder 1. Further evident from FIG. 6 is the bitumen panel 18, which has been applied on the fastening tongues 7.

In FIG. 6, it is further drawing-wise illustrated by a breakaway area 19 how the fastening tongue 7 of the northern holder 3 of the solar module holder 1 is placed over the fastening tongue 107 of the solar module holder 101, in order to create an overlapping area. In the overlapping area, the fastening tongue 7 is connected to the fastening tongue 107 via blind rivets through the drill holes 10. In this manner, the solar module holder 1 and the solar module holder 101 are connected to each other. The blind rivet connection exists in a corresponding manner for each pair of overlapping fastening tongues 7, 107.

Not shown in the figures and likewise within the scope of the invention, a fastening tongue 7 can protrude into the area between the southern holder 2 and the northern holder 3 of the same solar module holder 1 and there be covered with a bitumen panel.

For mounting the solar module, essentially three mounting phases are applied. These may either be slightly offset in time and substantially simultaneously performed, or sequentially after one another.

Initially, one starts at the southern side of a flat roof to connect a row of southern holders 2 with each other via the connectors 17 by blind-riveting. The southern holders 2 connected to each other are aligned exactly in the desired orientation with respect to the sun. Subsequently, the stabilizers 15 are mounted on the southern holders 2 by means of blind rivets, and in the next step, the northern holders 3 are riveted onto the stabilizers 15. Additionally, the northern holders 3 arranged adjacent to each other are each riveted together with two connectors 17. Each solar module holder is mounted with three stabilizers 15, of which two are arranged at the edge and one in the center. The fastening tongues 7 of the following southern holder 2 of the solar module holder 101 adjacent to the rear are riveted to the fastening tongues 7 of the solar module 1 on the roof surface.

In the second mounting phase, a bitumen panel is applied in the intermediate state between the first solar module holder 1 and the second solar module holder and welded onto the flat roof. In this way, the fastening tongues of the holders 2, 3 including the outer folding slats 8, are firmly connected to the roof surface. These two mounting stages are carried out with further solar module holding units. In a third and last mounting phase, the solar modules are applied and mounted. this can occur when the first solar module holding row has been welded onto the roof. But it is also possible to initially weld all solar module holders onto the roof and to subsequently insert all solar modules in one working step.

In particular for mounting the solar module holder 1, 101 according to the invention on older roofs, the roof surface can be provided for pretreatment with a bitumen coating serving as an adhesion facilitator.

In this manner, a solar module holder and a method for mounting it on a roof surface, in particular a flat roof surface, is proposed, which completely avoids damage to the roof. Further, also burdening the roof construction with a high mass is avoided to the greatest extent because the assemblies consist of lightweight metal, in particular punched aluminum sheets, and thus have a small mass.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A method of mounting a holding and fastening device for at least one solar module in a predetermined alignment on a roof surface, the holding and fastening device having two carrier elements that are arranged parallel at a predetermined distance from each other, each of the two carrier elements having a receiving surface for receiving the solar module at a distance above a roof surface, the receiving surface of one of the two carrier elements being arranged at a different distance from the roof surface than the receiving surface of the other carrier element, both receiving surfaces having a lining of elastomeric vibration-damping material;
   at least two vertical stabilizing elements connecting the carrier elements at the predetermined distance from each other; and
   fastening means for fastening to the roof surface, the fastening means having at least one flat support section with a support surface for a plane-parallel support on the roof surface,
   wherein at least one of the carrier elements is provided with connector means for fastening to at least one further carrier element of a further holding and fastening device,
   the method comprising the steps of:
   preassembling the two carrier elements and the at least two vertical stabilizing elements with one another to form the holding and fastening device in absence of the solar module to form a preassembled holding and fastening device;
   placing the preassembled holding and fastening device on the roof surface with the planar support section in a plane-parallel manner;
   placing a fastening layer over the support section, the fastening layer extending beyond the support section; and
   creating an adhesive connection between the fastening layer and the roof surface in such a way that the support section of the preassembled holding and fastening device is pressed onto the roof surface and secured thereto by the fastening layer in absence of the solar module while the roof surface remains intact.

2. The method according to claim 1, wherein the adhesive connection is created by welding or gluing the fastening layer onto the roof surface.

3. The method according to claim 1, further comprising the step of pretreating the roof surface with a bitumen coating prior to creating the adhesive connection.

4. The method according to claim 1, comprising, after placing a first holding and fastening device on the roof surface, the further step of
   placing a second holding and fastening device on the roof surface adjacent to the first holding and fastening device;
   fastening the second holding and fastening device to the first holding and fastening device;
   pressing the support sections of the second holding and fastening device onto the roof surface via the fastening layer.

5. The method according to claim 4, further comprising that a continuous fastening layer is used for fastening both the first and the second support sections.

6. The method according to claim 1, wherein the at least two vertical stabilizing elements have a generally triangular shape.

7. The method according to claim 1, wherein the support surface is configured for aiding an adhesive connection with the roof surface.

8. The method according to claim 1, further comprising that the fastening layer is a weldable roofing panel.

9. The method according to claim 1, wherein at least one of the carrier elements or at least one vertical stabilizing element is provided with a vent opening.

10. The method according to claim 1, wherein the holding and fastening device is assembled from stamped lightweight sheet metal.

* * * * *

UNITED STATES PATENT AND TRADEMARK OFFICE
CERTIFICATE OF CORRECTION

PATENT NO. : 8,820,030 B2
APPLICATION NO. : 13/320475
DATED : September 2, 2014
INVENTOR(S) : Jens Sager, Toni Grab-Renner and Andreas Babbe Page 1 of 1

It is certified that error appears in the above-identified patent and that said Letters Patent is hereby corrected as shown below:

On the Title Page

In item (73) after "Assignee:" replace "F&F Vermogens GBR, Holstein (DE)" with --F&F Vermögens GBR, Neustadt in Holstein (DE)--.

Signed and Sealed this
Nineteenth Day of May, 2015

Michelle K. Lee
*Director of the United States Patent and Trademark Office*